(12) United States Patent
Maurer et al.

(10) Patent No.: US 11,185,838 B2
(45) Date of Patent: Nov. 30, 2021

(54) NEUTRALIZATION AND CONTAINMENT OF REDOX SPECIES PRODUCED BY CIRCUMFERENTIAL ELECTRODES

(71) Applicant: CUSTOMARRAY, INC., Bothwell, WA (US)

(72) Inventors: Karl Maurer, Everett, WA (US); John J Cooper, Jr., Seattle, WA (US); H Sho Fuji, Seattle, WA (US); Joseph Leonetti, Daly City, CA (US)

(73) Assignee: CustomArray, Inc., Redmond, WA (US)

( * ) Notice: Subject to any disclaimer, the term of this patent is extended or adjusted under 35 U.S.C. 154(b) by 138 days.

(21) Appl. No.: 16/699,582

(22) Filed: Nov. 30, 2019

(65) Prior Publication Data

US 2020/0086290 A1   Mar. 19, 2020

Related U.S. Application Data

(60) Continuation of application No. 15/208,606, filed on Jul. 13, 2016, now Pat. No. 10,525,436, which is a
(Continued)

(51) Int. Cl.
*B01J 19/00*   (2006.01)
*C25B 11/02*   (2021.01)
(Continued)

(52) U.S. Cl.
CPC .......... *B01J 19/0046* (2013.01); *B82Y 30/00* (2013.01); *C25B 3/29* (2021.01); *C25B 9/17* (2021.01); *C25B 11/02* (2013.01); *B01J 2219/00527* (2013.01); *B01J 2219/00529* (2013.01); *B01J 2219/00576* (2013.01);
(Continued)

(58) Field of Classification Search
None
See application file for complete search history.

(56) References Cited

U.S. PATENT DOCUMENTS

| 3,720,591 A | 3/1973 | Skarlos |
| 3,950,357 A | 4/1976 | Kahan |

(Continued)

FOREIGN PATENT DOCUMENTS

| EP | 1420252 | 5/2004 |
| JP | 2005166601 | 6/2006 |

(Continued)

OTHER PUBLICATIONS

ISR, Application No. 05849631.6 PCT/US2005/041906, dated May 24, 2007, 4 pages.
(Continued)

*Primary Examiner* — Harry D Wilkins, III
(74) *Attorney, Agent, or Firm* — Sci-Law Strategies PC

(57) ABSTRACT

There is disclosed an electrode array architecture employing continuous and discontinuous circumferential electrodes. There is further disclosed a process for the neutralization of acid generated at anode(s) by base generated at cathode(s) circumferentially located to each other so as to confine a region of pH change. The cathodes can be displayed as concentric rings (continuous) or as counter electrodes in a cross pattern (discontinuous). In this way reagents, such as acid, generated in a center electrode are countered (neutralized) by reagents, such as base, generated at the corners or at the outer ring.

20 Claims, 12 Drawing Sheets

Specification includes a Sequence Listing.

Related U.S. Application Data division of application No. 11/108,078, filed on Apr. 15, 2005, now Pat. No. 9,394,167.

(51) Int. Cl.
    *C25B 9/17* (2021.01)
    *C25B 3/29* (2021.01)
    *B82Y 30/00* (2011.01)

(52) U.S. Cl.
    CPC ............ *B01J 2219/00585* (2013.01); *B01J 2219/00596* (2013.01); *B01J 2219/00641* (2013.01); *B01J 2219/00653* (2013.01); *B01J 2219/00659* (2013.01); *B01J 2219/00675* (2013.01); *B01J 2219/00713* (2013.01); *B01J 2219/00722* (2013.01); *B01J 2219/00725* (2013.01); *B01J 2219/00731* (2013.01); *B01J 2219/00736* (2013.01)

(56) References Cited

U.S. PATENT DOCUMENTS

| | | |
|---|---|---|
| 4,165,320 A | 8/1979 | Ondetti |
| 4,563,263 A | 1/1986 | Oyama |
| 4,840,893 A | 6/1989 | Hill |
| 5,143,854 A | 9/1992 | Pirrung |
| 5,445,934 A | 8/1995 | Fodor |
| 5,510,270 A | 4/1996 | Fodor |
| 5,540,828 A | 7/1996 | Yacynych |
| 5,653,939 A | 8/1997 | Hollis |
| 5,667,667 A | 9/1997 | Southern |
| 5,695,940 A | 12/1997 | Drmanac |
| 5,723,344 A | 3/1998 | Malibat |
| 5,766,550 A | 6/1998 | Kaplan |
| 5,807,837 A | 9/1998 | Furukawa |
| 5,824,473 A | 10/1998 | Meade |
| 5,874,047 A | 2/1999 | Schoning |
| 5,912,339 A | 6/1999 | Miller |
| 5,928,905 A | 7/1999 | Stemmer |
| 5,929,208 A | 7/1999 | Heller |
| 5,953,681 A | 9/1999 | Cantatore |
| 6,013,440 A | 1/2000 | Lipshutz |
| 6,017,696 A | 1/2000 | Heller |
| 6,051,380 A | 4/2000 | Sosnowski |
| 6,066,448 A | 5/2000 | Wohlstader |
| 6,093,302 A | 7/2000 | Montgomery |
| 6,280,595 B1 | 8/2001 | Montgomery |
| 6,320,041 B1 | 11/2001 | Hogrefe |
| 6,391,558 B1 | 5/2002 | Henkens |
| 6,444,111 B1 | 9/2002 | Montgomery |
| 6,456,942 B1 | 9/2002 | Anderson |
| 6,475,699 B2 | 11/2002 | Uetani |
| 6,518,024 B2 | 2/2003 | Choong |
| 6,576,426 B2 | 6/2003 | Southern |
| 6,586,211 B1 | 7/2003 | Stabler |
| 6,743,564 B2 | 6/2004 | Hatakeyama |
| 6,780,582 B1 | 8/2004 | Wagner |
| 6,824,669 B1 | 11/2004 | Li |
| 6,921,636 B1 | 7/2005 | Brennan |
| 6,960,298 B2 | 11/2005 | Krotz |
| 7,008,769 B2 | 3/2006 | Henderson |
| 7,541,314 B2 | 6/2009 | Suciu |
| 7,557,069 B2 | 7/2009 | Strathmann |
| 8,855,955 B2 | 10/2014 | Peyvan |
| 9,267,213 B1 | 2/2016 | Maurer |
| 9,339,782 B1 | 5/2016 | Gindilis |
| 9,394,167 B2 | 7/2016 | Maurer |
| 9,983,204 B2 | 5/2018 | Maurer |
| 10,006,131 B1 | 6/2018 | Maurer |
| 10,261,075 B2 | 4/2019 | Maurer |
| 10,286,377 B1 | 5/2019 | Gindilis |
| 10,525,436 B2 | 1/2020 | Maurer |
| 2001/0053529 A1 | 12/2001 | Gindilis |
| 2002/0090738 A1 | 7/2002 | Cozzette |
| 2002/0172963 A1 | 11/2002 | Kelley |
| 2003/0022150 A1 | 1/2003 | Sampson |
| 2003/0050437 A1 | 3/2003 | Montgomery |
| 2003/0111356 A1 | 6/2003 | Strathmann |
| 2003/0113713 A1 | 6/2003 | Glezer |
| 2003/0134989 A1 | 7/2003 | Aldrich |
| 2003/0152919 A1 | 8/2003 | Roelens |
| 2003/0186226 A1 | 10/2003 | Brennan |
| 2003/0190632 A1 | 10/2003 | Sosnowski |
| 2003/0194709 A1 | 10/2003 | Yang |
| 2004/0073017 A1 | 4/2004 | Skrzypcznski |
| 2004/0238369 A1 | 12/2004 | Southern |
| 2005/0043894 A1 | 2/2005 | Fernandez |
| 2005/0212902 A1 | 9/2005 | Cook |
| 2005/0239112 A1 | 10/2005 | Padmanabhan |
| 2005/0272088 A1 | 12/2005 | Cook |
| 2006/0035218 A1 | 2/2006 | Oleinikov |
| 2006/0102471 A1 | 5/2006 | Adermann |
| 2006/0105355 A1 | 5/2006 | Maurer |
| 2006/0160100 A1 | 7/2006 | Gao |
| 2006/0231411 A1 | 10/2006 | Maurer |
| 2007/0034513 A1 | 2/2007 | Maurer |
| 2007/0065877 A1 | 3/2007 | Maurer |
| 2007/0072169 A1 | 3/2007 | Peyvan |
| 2007/0231794 A1 | 10/2007 | Dill |
| 2007/0292855 A1 | 12/2007 | Dubin |
| 2008/0035494 A1 | 2/2008 | Gomez |
| 2008/0039342 A1 | 2/2008 | Tian |
| 2008/0125327 A1 | 5/2008 | Kumar |
| 2009/0280998 A1 | 11/2009 | Maurer |
| 2011/0281766 A1 | 11/2011 | Cooper |
| 2016/0354751 A1 | 12/2016 | Maurer |

FOREIGN PATENT DOCUMENTS

| | | |
|---|---|---|
| WO | WO9603417 | 2/1996 |
| WO | WO0051721 | 9/2000 |
| WO | WO0123082 | 4/2001 |
| WO | WO0231463 | 4/2002 |
| WO | WO0231481 | 4/2002 |
| WO | WO02090963 | 11/2002 |
| WO | WO02103061 | 12/2002 |
| WO | WO03020415 | 3/2003 |
| WO | WO04024886 | 3/2004 |
| WO | WO2006055810 | 5/2006 |

OTHER PUBLICATIONS

Extended European Search Report, Application No. 05849631.6, PCT/US2005/041906, dated Sep. 23, 2010, 9 pages.
Office Action, Application No. 05849631.6, PCT/US2005/041906, dated May 2, 2012, 3 pages.
Rule 71(3) EPC European Communication, Application No. 05849631.6 PCT/US2005/041906, dated Jul. 23, 2018, 11 pages.
Article 94(3) European Communication, Application No. 05849631.6 PCT/US2005/041906, dated Nov. 25, 2015, 5 pages.
Extended European Search Report, Application No. 06739757.0 PCT/US2006/011150, dated Jan. 20, 2011, 9 pages.
Communication from the examining division, Application No. 06739757.0 PCT/US2006/011150, dated Dec. 11, 2015, 29 pages.
European Search Report, Application No. EP06750351.6 PCT/US2006/014288 dated Dec. 2, 2010, 9 pages.
Office Action, Application No. 06750351.6, PCT/US2006/014288 dated Feb. 21, 2013, 4 pages.
Article 116(1) European Communication, Application No. 06750351.6, PCT/US2006/014288, dated Nov. 24, 2015, 9 pages.
Article 94(3) European Communication, Application No. 05849631.6 PCT/US2005/041906, dated Jan. 30, 2018, 4 pages.
Response to Article 94(3) European Communication, Application No. 05849631.6 PCT/US2005/041906, dated May 22, 2018, 3 pages.
Amended Claims filed in response to Article 94(3) European Communication, Application No. 05849631.6 , PCT/US2005/041906, dated May 22, 2018, 4 pages.
Amendment filed in response to Rule 115(1) EPC Communication, Application No. 06739757.0 PCT/US2006/011150, dated Dec. 18, 2018, 6 pages.

(56) References Cited

OTHER PUBLICATIONS

Auxiliary Request II Claims filed in response to Rule 115(1) EPC Communication, Application No. 06739757.0 PCT/US2006/011150, dated Dec. 18, 2018, 1 page.
Communication from the examining division, Application No. 06739757.0 PCT/US2006/011150, dated Jan. 11, 2019, 2 pages.
Extended European Search Report, Application No. EP 19159642.8 based on EP05849631.6 based on PCT/US2006/014288, dated May 14, 2019, 6 pages.
Extended European Search Report, Application No. EP19159586.7 based on EP06739757.0 based on PCT/US2006/011150, dated May 13, 2019, 8 pages.
Afshari et al., "Application of Complementary DNA Microarray Technology to Carcinogen Identification . . . ", Cancer Res., 1999, pp. 4759-4760, vol. 59.
Bard et al., "Azo, Azoxy and Diazo Compounds," Encyclo. of Electrochemistry of the Elements, 1979, pp. 179-209, vol. XIII-4, NY, NY.
Bakker E (2004) Electrochemical sensors. Anal Chem 76: 3285-3298.
Batchelor-McAuley, C. et al., The physicochemical aspects of DNA sensing using electrochemical methods. Biosens. Bioelectron. 2009, 24, 3183-3190.
Beier et al., "Versatile Derivatisation of Solid Support Media for Convalent Bonding . . . " Nucleic Acids Research, 1999, pp. 1970-1977, vol. 27, No. 9.
Caillat, P et al., Biochips on CMOS: An active matrix address array for DNA analysis. Sens. Actuat. B: Chem. 1999, 61, 154-162.
Cahill et al., "Protein Arrays & Their Role in Proteomics" Adv. Biochem. Engin/Biotechnol., 2003, pp. 177-187, vol. 83.
Campbell et al., "Enzyme-Amplified Amperometric Sandwich Test for RNA and DNA" Anal. Chem., 2002, 158-162, 74(1) American Chemical Society.
Chen, C. et al., Building addressable libraries: The use of a mass spectrometry cleavable linker for monitoring reactions on a microelectrode array. J. Am. Chem. Soc. 2006, 128, 16020-16021.
Cosnier S (1999) Biomolecule immobilization on electrode surfaces by entrapment or attachment to electrochemically polymerized films. A review. Biosensors & Bioelectronics 14: 443-456.
Cuzin, M. DNA chips: A new tool for genetic analysis and diagnostics. Transfus. Clin. Biol. 2001, 8, 291-296.
Daniels, J. S.; Pourmand, N. Label-free impedance biosensors: opportunities and challenges. Electroanalysis 2007, 19, 1239-1257.
De Giglio, E.; Sabbatini, L.; Zambonin, P. G. Development and analytical characterization of cysteine-grafted polypyrrole films electrosynthesized on Pt- and Ti-substrates as precursors of bioactive interfaces. J. Biomater. Sci. Polym. Ed. 1999, 10, 845-858.
Diaz-Gonzales M, Gonzalez-Garcia M B, Costa-Garcia A (2005) Recent advances in electrochemical enzyme immunoassays. Electroanalysis 17: 1901-1918.
Dill et al., "Antigen Detection Using Microelectrode Array Microchips" Analytica Chimica Acta, 2001, pp. 69-78, vol. 444.
Dill et al., "Immunoassays and Sequence-Specific DNA Detection on a Microchip . . . " J. Biochem. Biophys. Methods, 2004, 59 pp. 181-187, Elsevier B.V.
Dill K, et al. (2004) Immunoassays based on electrochemical detection using microelectrode arrays. Biosensors & Bioelectronics 20: 736-742.
Drummond et al., "Electrochemical DNA Sensors" Nature Biotechnology Oct. 2003, 1192-1199, vol. 21, No. 10 Nature Publishing Group.
Egeland et al., "An Electrochemical Redox Couple Activitated by Microelectrodes for Confined Chemical Patterning of Surfaces" Analytical Chemistry (2002) vol. 74, pp. 1590-1596.
Fledler et al., "Diffusional Electrotitration: Generation of pH Gradients . . . " Analytical Chemistry, Mar. 1, 1995, pp. 820-828, vol. 67, No. 5.
Fodor et al., "Light-Directed, Spatially Addressable Parallel Chemical Synthesis" Science, Feb. 15, 1991, 767-773, vol. 251.

Galandoava, J.; Labuda, J. Polymer interfaces used in electrochemical DNA-based biosensors. Chem. Pap. 2009, 63, 1-14.
Gambhir, A. et al., Characterization of DNA immobilized on electrochemically prepared conducting polypyrrole-polyvinyl sulfonate films. Appl. Biochem. Biotechnol. 2001, 96, 303-309.
Gao et al., "In Situ Synthesis of Oligonucleotide Microarrays" Biopolymers Mar. 2004, pp. 579-596, vol. 73.
Ghindilis et al., "Immunosensors: Electrochemical Sensing and Other . . . " Biosensors & Bioelectronics 1998, pp. 113-131, vol. 13, Elsevier Sciences S.A.
Ghindilis, A. L. et al., CombiMatrix oligonucleotide arrays: genotyping and gene expression assays employing . . . Biosens. Bioelectron. 2007, 22, 1853-1860.
Greene et al., "Protective Groups in Organic Synthesis" Third Edition, Wiley-Interscience, 1999.
Guo, et al., "Direct Fluorescence Analysis of Genetic Polymorphisms by Hybridization with Oligonucleotide . . . " Nucl. Acids Res., 1994, pp. 5456-5465, vol. 22, No. 24.
Hacia "Resequencing and mutational analysis using oligonucleotide microarrays" Nature Genetics 21 Supp.: 42, (1999).
Hacia et al., "Applications of DNA Chips For Genomic Analysis" Mol. Psychiatry, Nov. 1998, pp. 483-492, vol. 3, No. 6.
Hammerich et al., "Chapter 16. Anodic Oxidation of Oxygen-Containing Compounds", In: Lund H, Baizer M.M. (Eds.) "Organic Electrochemistry, An Introduction & Guide", 3rd Edition, 1991 pp. 615-657 Marcel Dekker, Inc., NY.
Johnston, "Gene Chips: Array of Hope for Understanding Gene Regulation" Curr. Biology, Feb. 26, 1998, R171-R174, vol. 8.
Krotz et al., "Large-Scale Synthesis of Antisense Oligonucleotides Without Chlorinated Solvents" Organic Process Res & Dev, 2000, pp. 190-193, vol. 4.
Kurian et al., "DNA Chip Technology", J. Pathology, 1999, pp. 267-271, vol. 187.
Labib M, et al., (2009) A capacitive biosensor for detection of staphylococcal enterotoxin B. Anal Bioanal Chem 393: 1539-1544.
Lane et al., "Electrochemistry of Chemisorbed Molecules . . . " J. Physical Chemistry, 1973, pp. 1411-1421, vol. 77, No. 11 ($1^{st}$ Page Only).
Leproust et al., "Characterization of Oligodeoxyribonucleotide Synthesis on Glass Plates" Nucl. Acids Res., 2001, pp. 2171-2180, vol. 29, No. 10 (Abstract Only).
Livache, T. et al., Polypyrrole based DNA hybridization assays: study of label free detection processes versus fluorescence on microchips. J. Pharm. Biomed. Anal 2003, 32, 687-696.
Livache, T et al., Polypyrrole DNA chip on a silicon device: example of hepatitis C virus genotyping. Anal. Biochem. 1998, 255, 188-194.
Livache, T. et al., Preparation of a DNA matrix via an electrochemically directed copolymerization of pyrrole and oligonucleotides bearing a pyrrole group. Nucleic. Acid. Res. 1994, 22, 2915-2921.
Lipkowski, et al., "Molecular Adsorption at Metal Electrodes", Electrochimica Acta, 1994, pp. 1045-1056, vol. 39, No. 8/9.
Maskos et al., "Oligodeoxyribonucleotide Synthesis on Glass Plates", Nucl. Acids Res., 1992, pp. 1679-1684, vol. 20.
Minehan, D. S.; Marx, K. A.; Tripathy, S. K. Kinetics of DNA binding to electrically conducting polypyrrole films. Macromolecules 1994, 27, 777-783.
Minehan, D. S.; Marx, K. A.; Tripathy, S. K. DNA binding to electropolymerized polypyrrole: The dependence on film characteristics. J. Macromol. Sci. Part A: Pure Appl. Chem. 2001, 38, 1245-1258.
Moller et al.. "Anodic oxidation of cyclohexene: Dependence of the product distribution on the reaction variables", Electrochimica Acta, vol. 42, No. 13, Jan. 1, 1997, pp. 1971-1978.
Ono et al., "Nucleosides and Nucleotides. 121. Synthesis of Oligonucleotides . . . " Bioconjugate Chem. 1993, pp. 499-508, vol. 4.
Palmisano F, Zambonin P G, Centoze D (2000) Amperometric biosensors based on electrosynthesised polymeric films. Fresenius Journal of Analytical Chemistry 366: 586-601.
Park, J. Y.; Park, S. M. DNA Hybridization sensors based on electrochemical impedance spectroscopy as a detection tool. Sensors 2009, 9, 9513-9532.

(56) References Cited

OTHER PUBLICATIONS

Patolsky et al. "Highly Sensitive Amplified Electronic Detection of DNA . . . " Chem. Eur. J., 2003, pp. 1137-1145, vol. 9, No. 5 Wiley-VCH Weinheim.

Patolsky et al., "Enzyme-Linked Amplified Electrochemical Sensing . . . " Langmuir 1999, vol. 15, No. 1,1 pp. 3703-3706, Am. Chemical Society.

Paul et al., "Acid Binding and Detritylation During Oligonucleotide Synthesis" Nucleic Acids Research, 1996, 3048-3052, vol. 24, No. 15.

Pellois et al.,"Peptide Synthesis Based on t-Boc Chemistry & Solution Photogenerated Acids" J. Comb. Chem. 2000, pp. 355-360, vol. 2, No. 4.

Peng, H.; Zhang, L.; Soeller, C.; Travas-Sejdic, J. Conducting polymers for electrochemical DNA sensing. Biomaterials 2009, 30, 2132-2148.

Pillai, "Photoremovable Protecting Groups in Organic Chemistry" Synthesis 1980, pp. 1-26, vol. 39.

Rahman M A, Kumar P, Park D-S, Shim Y-B (2008) Electrochemical sensors based on organic conjugated polymers. Sensors 8: 118-141.

Ramanaviciene A, Ramanavicius A (2002) Application of polypyrrole for the creation of immuno sensors. Critical Reviews in Analytical Chemistry 32: 245-252.

Ramanavicius A, Ramanaviciene A, Malinauskas A (2006) Electrochemical sensors based on conducting polymer-pyrrole. Electrochimica Acta 51: 6027-6037.

Ramanavicius, A et al., Conducting polymer based fluorescence quenching as a new approach to increase the selectivity . . . Biosen. Bioelectron. 2007, 23, 499-505.

Ronlan, A et al., "Anodic oxidation of phenolic compounds. Part II. Products and mechanisms of the anodic oxidation of hindered phenols" J. Chem. Soc. (C), 1971, pp. 3214-3218.

Roth, K. M.; Peyvan, K.; Schwarzkopf, K. R.; Ghindilis, A. Electrochemical detection of short dna oligomer hybridization using the CombiMatrix electrasense microarray reader. Electroanalysis 2006, 18, 1982-1988.

Rossler et al., "Enzyme Linked Immunsorbent Assay on a Microchip . . . " Lab on a Chip 2001, vol. 1, pp. 153-157, The Royal Society of Chemistry.

Sadik O A, Ngundi M, Wanekaya A (2003) Chemical biological sensors based on advances in conducting electroactive polymers. Microchimica Acta 143: 187-194.

Sadki S, Schottland P, Brodie N, Sabouraud G (2000) The mechanisms of pyrrole electropolymerization. Chemical Society Review 29: 283-293.

Septak, M. "Kinetic Studies on Depurination and Detrytylation of CPG-bound Intermediates . . . " Nucleic Acids Research, 1996, pp. 3053-3058, vol. 24, No. 15.

Shchepinov et al., "Steric Factors Influencing Hybridisation of Nucleic Acids to Oligonucleotide Arrays" Nucl., Acids Res., 1997, pp. 1155-1161, vol. 25, No. 6.

Shchepinov, M.S., "Oligonucleotide Dendrimers: From Poly-Labeled DNAc617 Probes to Stable Nano-Structures" Glen Report, Dec. 1999, vol. 12, No. 1.

Song, X.; Wang, H. L.; Shi, J.; Park, J. W.; Swanson, B. I. Conjugated polymers as efficient fluorescence quenchers and their applications for bioassays. Chem. Mater. 2002, 14, 2342-2347.

Soriaga et al., "Determination of Orientation of Adsorbed Molecules . . . ", J. Am. Chem. Soc., 1982, pp. 3937-3945, vol. 104 (1$^{st}$ Page Only).

Stickney et al., "A Survey of Factors Influencing the Stablity of . . . " J. Electroanaly. Chem., 1981, pp. 73-88, vol. 125 (Abstract Only).

Stuart, M.; Maurer, K.; Moeller, K. D. Moving known libraries to an addressable array: A site-selective hetero-Michael reaction. Bioconjug. Chem. 2008, 19, 1514-1517.

Tesfu, E. et al., Building addressable libraries: Site selective coumarin synthesis and the "real-time" signaling . . . Org. Lett. 2006, 8, 709-712.

Trojanowicz M (2003) Application of conducting polymers in chemical analysis. Microchimica Acta 143: 75-91.

Vestergaard M.D., Kerman K, Tamiya E (2007) An overview of label-free electrochemical protein sensors. Sensors 7: 3442-3458.

Vidal J-C, et al., (2003) Recent Advances in electropolymerized conducting polymers in amperometric biosensors. Microchimica Acta 143.

Wang, G. et al., "Synthesis of Oligonucleotides Containing . . . " Tetrahedron Letters, 1993, 6721-6724, vol. 34, No. 42, Great Britain.

Wang et al., "Dual Enzyme Electrochemical Coding for Detecting DNA Hybridization" Analyst 2002, 1279-1282, The Royal Society of Chemistry.

Wang, J., "Survey and Summary from DNA Biosensors . . . " Nucleic Acids Research 2000, pp. 3011-3016, vol. 28, No. 16 Oxford University Press.

Wilgenbus and Lichter, DNA Chip Technology Ante Portas, J. Mol. Med., 1999, pp. 761-768, vol. 77.

Wu and Chen, J. Mater. Chem., 1997, 7(8), pp. 1409-1413.

Xie et al., Amperometric Detection of Nucleic Acid at Femtomolar Levels with a Nucleic Acid/Electrochemical Activator Bilayer on Gold Electrodes, 2004, vol. 76, pp. 1611-1617.

Zhang S, Wright G, Yang Y (2000) Materials and techniques for electrochemical biosensor design and construction. Biosensors & Bioelectronics 15: 273-282.

Zhou, Y.; Yu, B.; Guiseppi-Elie, A.; Sergeyev, V.; Levon, K. Potentiometric monitoring DNA hybridization. Biosens. Bioelectron. 2009, 24, 3275-3280.

Chip #7354:
4 cathodes surround
Each anode. 5mM lutidine.

Chip #0200033:
0 cathodes surround
Each anode. Off chip Pt common cathode. 20mM lutidine

```
SEQUENCE LISTING

<160> NUMBER OF SEQ ID NOS: 2

<210> SEQ ID NO 1
<211> LENGTH: 15
<212> TYPE: DNA
<213> ORGANISM: Homo sapiens

<400> SEQUENCE: 1
cctcgaccac cgcat                                                    15

<210> SEQ ID NO 2
<211> LENGTH: 15
<212> TYPE: DNA
<213> ORGANISM: Homo sapiens

<400> SEQUENCE: 2
ggagctggtg gcgta                                                    15
```

NEUTRALIZATION AND CONTAINMENT OF REDOX SPECIES PRODUCED BY CIRCUMFERENTIAL ELECTRODES

PRIORITY CLAIM

This application is a continuation of U.S. application Ser. No. 15/208,606, entitled "Neutralization and containment of redox species produced by circumferential electrodes" by Karl Maurer et al., filed Jul. 13, 2016, which claims priority to and is a divisional of U.S. application Ser. No. 11/108,078, entitled "Neutralization and containment of redox species produced by circumferential electrodes" by Karl Maurer et al. filed Apr. 15, 2005, which issued as U.S. Pat. No. 9,394,167, on Jul. 19, 2016, each of which application is herein expressly incorporated by reference in its entirety.

REFERENCE TO A "SEQUENCE LISTING," A TABLE, OR A COMPUTER PROGRAM LISTING APPENDIX SUBMITTED AS AN ASCII TEXT FILE

The Sequence Listing written in file CUST-01118US2_ST25.TXT, created Jun. 6, 2018, 726 bytes, machine format IBM-PC, MS-Windows operating system, is hereby incorporated by reference.

TECHNICAL FIELD OF THE INVENTION

The present invention provides an electrode array for electrochemical synthesis of oligomers by confining the volume of electrochemically-generated reagents by means of a continuous or discontinuous circumferential electrode surrounding a selected electrode. The present invention further provides a process for synthesizing oligomers comprising providing an electrode array device having circumferential electrodes that are separately addressable.

BACKGROUND OF THE INVENTION

Rapid developments in the field of DNA microarrays have lead to a number of methods for synthetic preparation of DNA. Such methods include spotting pre-synthesized oligonucleotides, photolithography using mask or maskless techniques, in situ synthesis by printing reagents, and in situ parallel synthesis on a microarray of electrodes using electrochemical deblocking of protective groups. A review of oligonucleotide microarray synthesis is provided by: Gao et al., Biopolymers 2004, 73:579. The synthetic preparation of a peptide array was originally reported in year 1991 using photo-masking techniques. This method was extended in year 2000 to include an addressable masking technique using photogenerated acids and/or in combination with photosensitizers for deblocking. Reviews of peptide microarray synthesis using photolabile deblocking are provided by: Pellois et al., J. Comb. Chem. 2000, 2:355 and Fodor et al., Science, 1991, 251:767. Spotting pre-synthesized peptides or isolated proteins has been used to create peptide arrays. A review of protein or peptide arrays is provided by: Cahill and Nordhoff, Adv. Biochem. Engin/Biotechnol. 2003, 83:177.

During the synthesis of DNA or peptides on a microarray or other substrate, each successive addition of a respective monomer (i.e., nucleotide or amino acid, respectively) involves the removal of a protecting group to allow addition of the next monomer unit. This process step is often called "deblocking." In such a removal or deblocking step, a specific type of solution can be used that is commonly referred to as a deblocking solution, i.e., the solution deblocks the end of the chain of a DNA, peptide, or other species by removing a protective group to allow the addition of a next monomer unit. In general, protective groups can be acid-lable or base-labile, i.e., acidic conditions remove the acid-labile group and basic conditions remove the base-labile group. Additionally, some protecting groups are labile to only specific types of reagents. Alternatively, deblocking can be accomplished using photolabile-protecting groups, which can be removed by light of a certain wavelength. A review of photoremoveable protecting chemistry is provided by: Photoremovable Protecting Groups in Organic Chemistry, Pillai, Synthesis 39:1-26 (1980). Use of protective groups is a common technique in organic synthesis. Reviews of protective group chemistry are provided by: Protective Groups in Organic Synthesis, Greene, T. W. and Wuts, P. G. M., Wiley-Interscience, 1999 and Protecting Group Chemistry, Robertson, J., Oxford University Press, 2001.

Protecting groups can be removed by electrochemically generated reagents on a microarray of electrodes (e.g., electrode array) as a step in the synthesis of polymers on the microarray. In this method, protecting groups are removed only at selected electrodes by applying a potential only at the selected electrodes. In order to prevent deprotection at neighboring electrodes (i.e., "crosstalk"), the method and the solution need to confine the electrochemically generated reagents to the region immediately adjacent to the electrode undergoing deblocking. Crosstalk refers to the bleed-over of reagents generated at one electrode to another nearby electrode causing undesirable extra synthesis at that nearby electrode. Minimal crosstalk is most desirable. Where an aqueous-based deblock solution having a buffer is used, the solution likely buffers the generation of acidic or basic species to the region near the electrode and prevents diffusion of such species to adjacent electrodes. However, in organic-based deblock solutions, the mechanism of preventing crosstalk is not necessarily well understood but may involve molecular interactions that remove or pacify acidic reagent by some other species.

Protecting groups can be removed by electrochemical methods on an electrode array device as a step in the synthesis of polymers on the microarray (Montgomery, U.S. Pat. Nos. 6,093,302, 6,280,595, and 6,444,111, referred to as the "Montgomery patents" the disclosures of which are incorporated by reference herein). In the Montgomery patents, protecting groups are removed only at selected electrodes by applying a potential only at the selected electrodes. In order to prevent deprotection at neighboring electrodes (often referred to as "crosstalk"), the method and the solution need to confine the electrochemically generated reagents to the region immediately adjacent to the electrode undergoing deblocking. In the Montgomery patents, a buffered aqueous-based deblock is used. The buffer absorbs acidic or basic species generated by an activated electrode (electrochemically) so that a pH change is confined to the region near the electrode.

The Montgomery patents disclose an aqueous-based deblock solution, specifically a 0.10 M solution and a 0.05 M solution of aqueous sodium phosphate buffer. The 0.10 M buffer solution had a pH of 7.2. In addition to the examples using sodium phosphate buffer, the Montgomery patents list various aqueous buffers including acetate buffers, borate buffers, carbonate buffers, citrate buffers, HEPES buffers, MOPS buffers, phosphate buffers, TRIS buffers, and KI solutions.

Southern, U.S. Pat. No. 5,667,667 discloses an organic deblocking (non-buffering) solution consisting of triethylammonium sulfate in acetonitrile (1% v/v sulphuric acid and 3% v/v triethylamine or 0.01% v/v sulphuric acid and 0.03% v/v triethylamine). Stoicheometrically, this organic solution appeared to have excess protons. As shown in the Montgomery patents, the Southern organic solution did not isolate deblocking on the microarray and showed considerable random deblocking around an area located a considerable distance away from the active electrodes.

Southern WO/020415 discloses a different method of confinement of an active redox product. Specifically, the active redox product is generated at an active electrode by at least one quenching redox product that is generated at adjacent electrodes. However, the geometry disclosed is electrodes in parallel lines of alternating cathodes and anodes and any "synthesis" generated on a glass slide surface located above the parallel lines of electrodes. The only deblocking solution disclosed is 25 mM of benzoquinone, 25 mM of hydroquinone, and 25 mM of tetrabutylammonium hexafluorophosphate in acetonitrile.

Hammerich and Svensmark (Anodic Oxidation of Oxygen-Containing Compounds, Hammerich, O., and Svensmark, B. in Organic Electrochemistry, an introduction and guide, edited by Lund, H and Baizer, M. M., Third Edition, Marcel Dekker, Inc., New York, 1991, pp. 615-657) disclose anodic oxidation of a hydroquinone bearing electron-withdrawing substituent under aqueous conditions, in aprotic solvents containing water, or in MeCN in the presence of pyridine. Hammerich and Svensmark further disclosed that dienones undergo acid-catalyzed rearrangement under strongly acidic conditions to reestablish hydroquinone derivatives or quinone if the reagent is water. Thus, Hammerich and Svensmark hydroquinone-benzoquinone redox deblocking system is the same as Southern WO/020415 and is prior art to Southern WO/020415.

The Montgomery electrochemical system described above works best if the buffering system is weak acid/weak base system (or a redox system). Hence the drop off in acid or base becomes exponential and is related to the $pK_i$ of the weak acid/conjugate base system. However, the Montgomery system encounters problems when the distance between electrodes is decreased (or the density of electrodes per unit area of an electrode array is increased. The extent of the proton plume will then depend upon the quantity of acid produced, the buffer capacity, and limits of diffusion (Oleinikov et al., J. Proteome Res. 2:313, 2003). Therefore, there is a need in the art to improve the system for electrochemical synthesis of oligomers when the density of electrodes is increased. The present invention was made to address this need.

SUMMARY OF THE INVENTION

The present invention provides an electrode array design having:

(a) a semiconductor electrode array having a top surface and a plurality of electrodes, wherein each electrode of the plurality of electrodes is separately addressable, wherein each electrode of the plurality of electrodes has a top conducting surface that makes up a part of the top surface of the semiconductor electrode array, and wherein each electrode of the plurality of electrodes is surrounded by insulating material;

(b) a continuous or discontinuous circumferential electrode that surrounds each electrode of the plurality of electrodes, wherein the circumferential electrode has a top conducting surface and an inner margin and an outer margin, wherein the inner margin borders with the insulating material that surrounds the electrode and the outer margin is surrounding by insulating material; and (c) a porous reaction layer of material that adsorbs to the surface of the electrodes and contains free hydroxyl groups or free amine groups or sulfhydryl groups (or combinations thereof) for covalent molecular binding, wherein the porous reaction layer forms a layer over the electrodes.

Preferably, the porous reaction layer is formed from polysaccharide and monosaccharide materials. Most preferably, the polysaccharide material is a disaccharide mixed with monosaccharides. Preferably, the insulating material that surrounds each of the plurality of electrodes has an average distance between each electrode and circumferential electrode of no more than 10 microns from the outer edge of each electrode to the inner edge of the surrounding circumferential electrode. Preferably, the plurality of electrodes are arranged in a pattern of rows and columns and the circumferential electrodes form a continuous or a discontinuous grid pattern similar to a tic-tack-toe board.

The present invention further provides a method for electrochemical oligomer synthesis on a dense electrode array when electrode margins are 50 microns or less distance from each other, comprising:

(a) providing a dense electrode array having separately addressable electrodes; and (b) conducting a deblocking step by addressing each active electrode with current or voltage and is surrounded by at least two neighboring electrodes that are biased with current or voltage as counter electrodes.

Preferably, the deblocking step addresses each active electrode with current. Preferably, at least four neighboring electrodes are counter electrodes. Preferably, the at least two neighboring counter electrodes are arranged in a pattern selected from the group consisting of nearest neighbor, neighbor electrodes, border of neighbor electrodes, border of nearest-neighbor, one closest available electrode, electrode that-is-not-approach, or a combination pattern thereof.

BRIEF DESCRIPTION OF THE DRAWINGS

FIG. 2 shows a portion of a polypeptide or protein parallel electrochemical synthesis reaction scheme. In this case tBoc is a preferred amino moiety protecting group. The protecting moiety is removed by acid generated at an anode when the electrode is turned on.

FIG. 9 shows a significant improvement in the containment of electrochemically generated acids in the upper region (discontinuous circumferential electrodes) to the lower region (no discontinuous electrodes used). The pH bleeding stopped when the discontinuous circumferential electrodes were turned on. Therefore these comparative data show the benefits of using a discontinuous circumferential electrode pattern when there is a close or tight configuration between electrodes because the presence of a buffer (see, Montgomery patents) was not sufficient to contain electrochemically generated acids when there are tight densities between electrodes in an electrode array (see FIG. 8).

DETAILED DESCRIPTION OF THE INVENTION

The basis of this invention is that a reactive chemical (protons in the case of DNA synthesis) and a reagent, which neutralizes that chemical (in the case of DNA synthesis this is some form of base methoxide or deprotonated hydroquinone) is produced at "opposite electrodes" to form a reagent wall (in the case of nucleic acid as the oligomer to be synthesized) to prevent crosstalk. By surrounding the functional or active electrode (the one producing the desired reagent) with the counter electrode (the one producing the neutralizing reagent) the inventive microarray device architecture, when used with the inventive process, creates a wall of concentrated highly reactive neutralizing agent. Moreover, unlike Southern WO/020415, the oligomer synthesized by the inventive process on the inventive electrode array device is synthesized within a porous matrix that overlies an active electrode and not in rows on a glass slide overlaying rows of electrodes. The inventive architecture and inventive method for electrochemical synthesis of oligomers enhances containment of the desired electrochemically-generated reactants to the specific area adjacent to the active electrode and the overlaying porous reaction layer but not to neighbor (inactive) electrodes and their overlaying porous reaction layers.

In the case of nucleic acid as the oligomer to be synthesized, the pH of the plume that diffuses away from the active or selected electrode can be measured in terms of the acid concentration and the conjugate base. Thus, the decrease in hydrogen ion concentration is exponential and related to the $pK_i$ of the weak acid. In addition the buffer capacity (related to weak acid concentration) of the media also plays a role in the containment of the protons. However, buffering alone, as described in the Montgomery patents, appear to be insufficient to contain electrochemically-generated reactants when such electrode borders are less than 50 microns apart.

Oligonucleotide Synthesis

Figure 1:
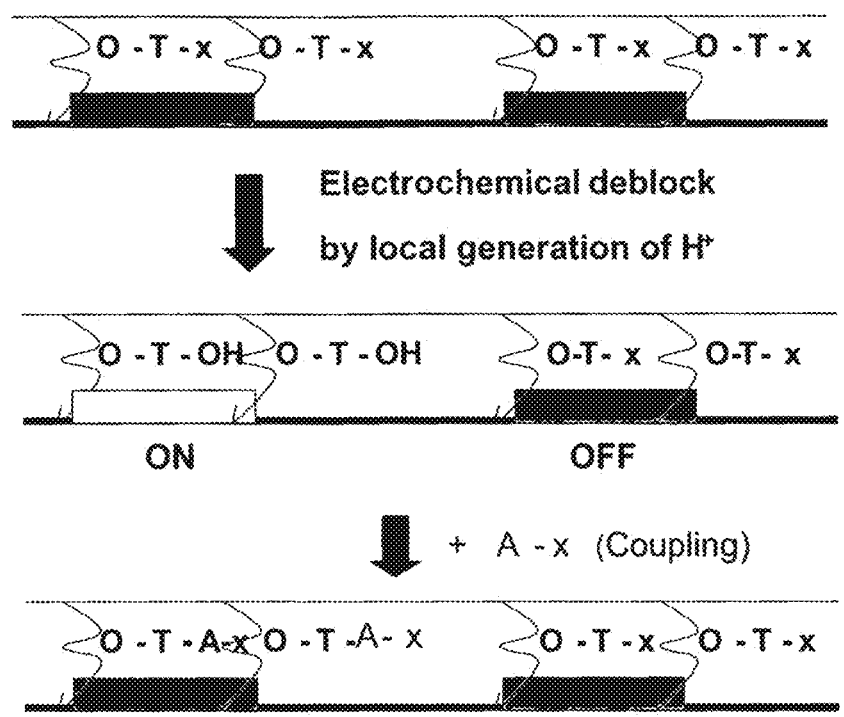
FIG. 1 shows a reaction scheme for electrochemical parallel DNA synthesis on a CMOS type of electrode array. The portion being shown is that of the "deprotection step." "0" stands for the oxygen atom on the matrix covering the electrode. "T" stands for the nucleotide T and "x" is a protecting group, which in a preferred embodiment is DMT. "A" stands for the nucleotide A. As noted, the electrodes can be turned on and off on an individual basis.

One of the steps in the oligonucleotide (DNA) synthesis on any solid surface is the deprotection of the C-5 hydroxyl group of the sugar ring. The protecting group is usually a bulky "trityl moiety" (dimethyltrityl or DMT) that can be removed in the presence of a trace of acid (Wang et al., Proceedings of the 219.sup.th ACS meeting August 1998, poster #3, page 184; Dill et al., Anal. Chim. Acta 444:69, 2001). Generation of acid at the anode removes the protecting group so that the next activated nucleotide may be attached. A scheme for the removal of the trityl group (DMT) is shown in FIG. 1.

The electrochemical reaction can only be confined and effective locally if enough H.sup.+ is generated at an electrode functioning as an anode and it is localized to the electrode in question. Any bleeding of acid to the neighboring electrode will produce incorrect oligonucleotide sequences at that electrode. The net result would be not only sequence infidelity, but also oligomers that would be composed of various lengths. The reliability of the whole synthesis chemistry would come into question. Therefore, the need to confine the pH to the region surrounding the selected electrode and not neighboring electrodes is so critical.

Peptide Synthesis

Figure 2:
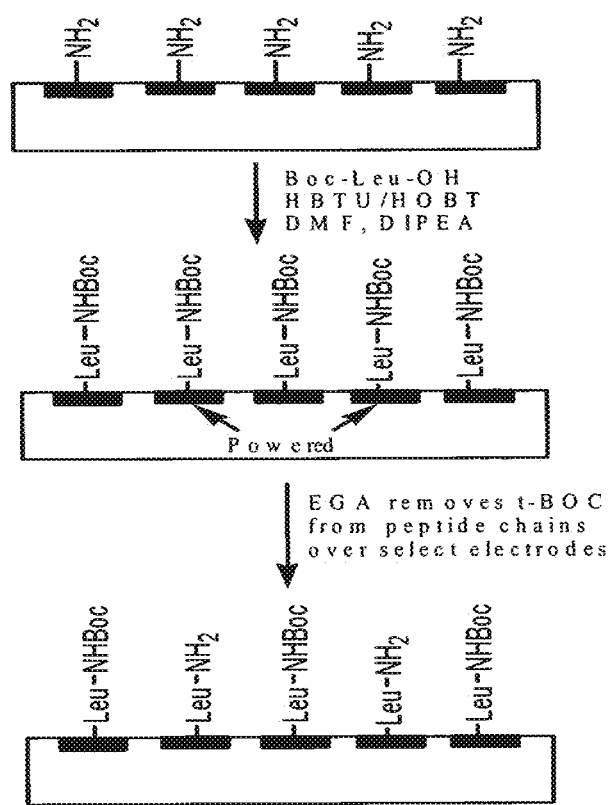

Peptide synthesis is carried out in a similar manner as the oligonucleotide synthesis. Often, the blocking group is tBoc, which can be removed in acid media. The schematic for the synthesis procedure is shown in FIG. 2. Again, acid generated at the electrode removes the protecting group. As in the case of oligonucleotide synthesis, it is crucial that the acid produced be contained within the area of the electrode.

Organic Reactions—Electro-Generation of Base

Figure 3:
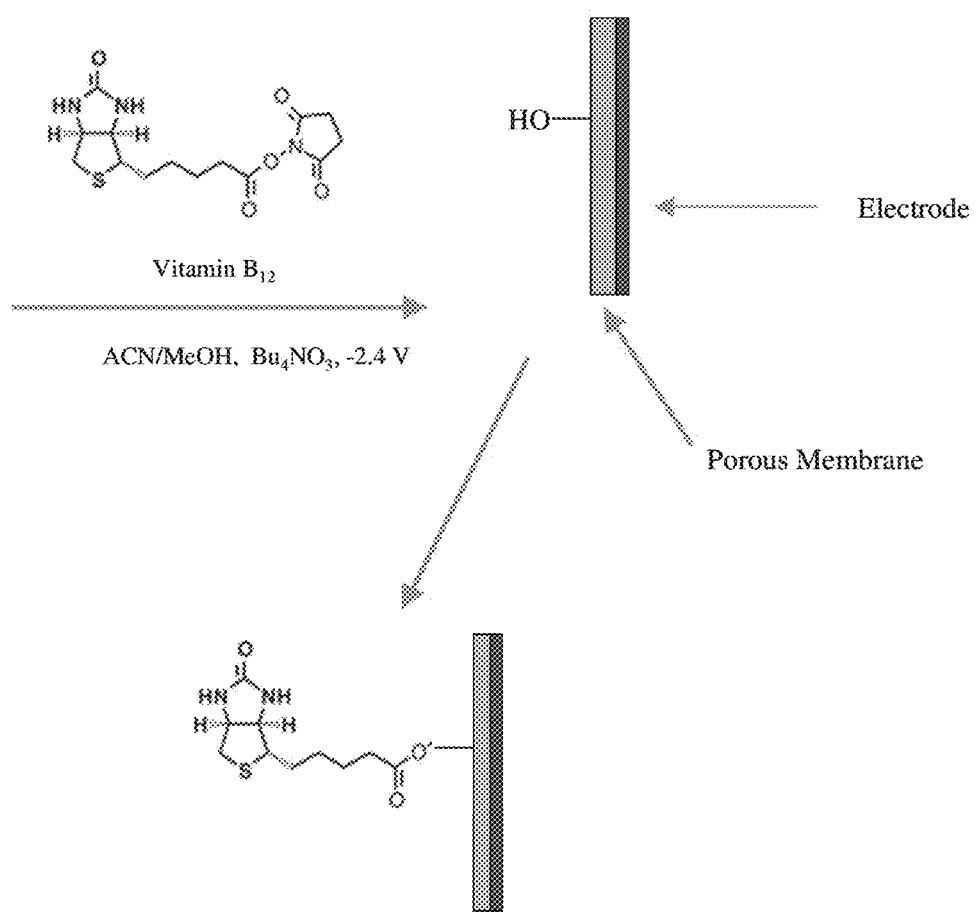
FIG. 3 shows a reaction scheme for the incorporation of an NHS-biotin moiety to a hydroxyl group located on a porous reaction layer on the electrode. In a preferred embodiment, this reaction is base catalyzed when the electrode acts as the cathode.

NHS esters may be attached to the porous matrix above the chip surface by the electrogeneration of base. FIG. 3 shows a suggested reactive route, although the exact mechanism is in question. In this case, the NHS ester is introduced (or reacted) with the hydroxyl on the surface of the membrane. However, a C—C bond formation has also been reported using slightly modified reaction conditions.

Inventive Method Advantages

The present inventive method confines synthesis conditions (such as pH) to selected areas surrounding a selected electrode on a microarray semiconductor device comprising a plurality of separately addressable electrodes. This method can also be used when producing and neutralizing redox species.

In prior Montgomery method, each individual electrode is turned on, so as to produce acid or base at some specific time. The electrochemically-generated reagent is confined to selected electrode areas based upon the buffer present in solution. The acid (or base) diffuses, until it reaches base (or acid), which neutralizes the electrochemically-generated species. Within a certain region, the acid (or base) produced eliminates all base (or acid) present and the pH of the local "hot spot" is very low (or very high) but not in the surrounding area. This allows deprotection to take place under appropriate pH conditions. If the electrode is turned on for a longer period of time (or set very high), the acid generated could exceed to base in the surrounding area and this would allow the acid to bleed from one electrode to another (crosstalk). Thus, the control of the acid generation is finely tuned to avoid a situation where the acid generated would override the buffering capacity of the solution in the vicinity of the electrode. This method has limitations because higher density electrode arrays have smaller distances between electrodes and a greater chance for crosstalk or pH bleed.

Therefore, the present invention uses a circumferential electrode as a counter electrode to contain the acid and neutralize the electrochemically generated reagents. A buffer may or may not need to be used.

In a first embodiment of the inventive method, a reactive chemical (protons in the case of DNA synthesis) and a reagent which neutralizes that chemical (in the case of DNA synthesis this is some form of base such as methoxide or deprotonated hydroquinone) is produced at circumferential counter electrodes. By biasing counter electrodes, when a selected electrode is an anode and generates acid (protons) electrochemically, the circumferential electrode is also biased to form a cathode (that is, a counter electrode to the anode) and generate base electrochemically. The base generated will act to neutralize acids diffusing away from the region of the selected (anode) electrode. By surrounding the selected electrode (the one producing the desired reagent) with the counter electrode (the one producing the neutralizing reagent) one creates a wall of concentrated highly reactive neutralizing agent to contain the desired reactant to the specific area of the active electrode and its overlaying porous reaction layer.

Figure 4:
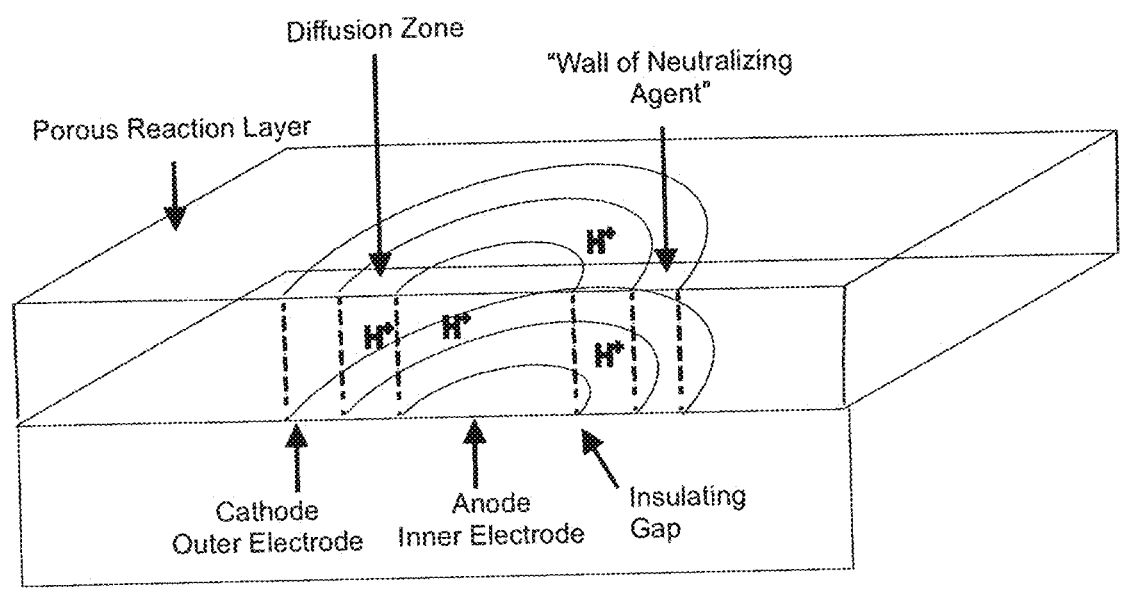
FIG. 4 shows a diagram of a 3D-section of a continuous circumferential electrode. The inner and outer electrodes are separated by insulated gap material. The gap region is called the "diffusion zone." In a preferred embodiment, a porous reaction layer covers both electrodes and the gap region.
Figure 5:
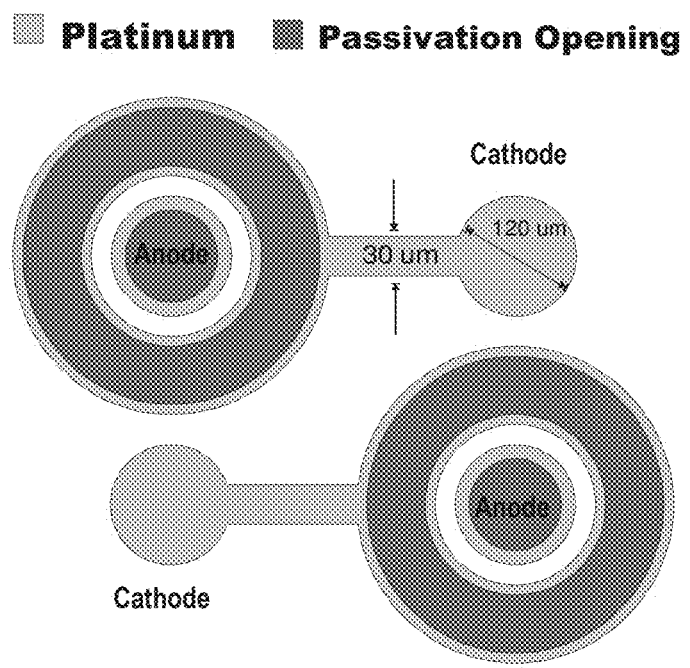
FIG. 5 shows a diagram showing a continuous circumferential electrode. The anode is one of the central electrodes, while the cathode ring is an extension of a neighboring electrode. The area called platinum is conducting.

For example in FIG. 4 protons are produced at a central anode. These protons are used to produce the desired reaction and their spatial containment is important to specific sequence formation. In the surrounding (ring) cathode, alkoxide or phenoxide bases are formed. Both of these materials diffuse some distance from their point of origin, however if a proton diffuses away from the anode area it crosses in to an area permeated with alkoxide and is rapidly eliminated ensuring containment of the acid to the anode area.

With regard to the make up of the solution, Montgomery discloses that the solution be composed of a buffer or scavenging agent in order to effect pH confinement surrounding an active electrode. However, when the distance between the outer edges of electrodes is 50 microns or less, even strong buffer solutions may not be sufficient to prevent bleeding over of pH changes. In the present inventive method and electrode array design for denser electrode arrays, the solution used during a deblocking step may or may not contain a buffer of varying strength.

Fabrication of Continuous Circumferential Electrodes

Continuous circular circumferential electrode array devices were fabricated using standard CMOS technology. This device utilized alternating array of circular active electrodes and continuous circumferential counter electrodes. In a CMOS process, the semiconductor silicon wafer is fabricated using aluminum wiring and electrodes and then "post-processed" by sputtering another metal, preferably Pt or Au. The post process masks (Platinum metal and passivation opening) for this device were modified to define a circumferential cathode around each anode (see diagram below).

As $H^+$ diffuses away from the anode, the proton encounters base produced at the circumferential cathode and is neutralized. The circumferential electrode design is simple to produce under the current fabrication procedures.

Figure 6:
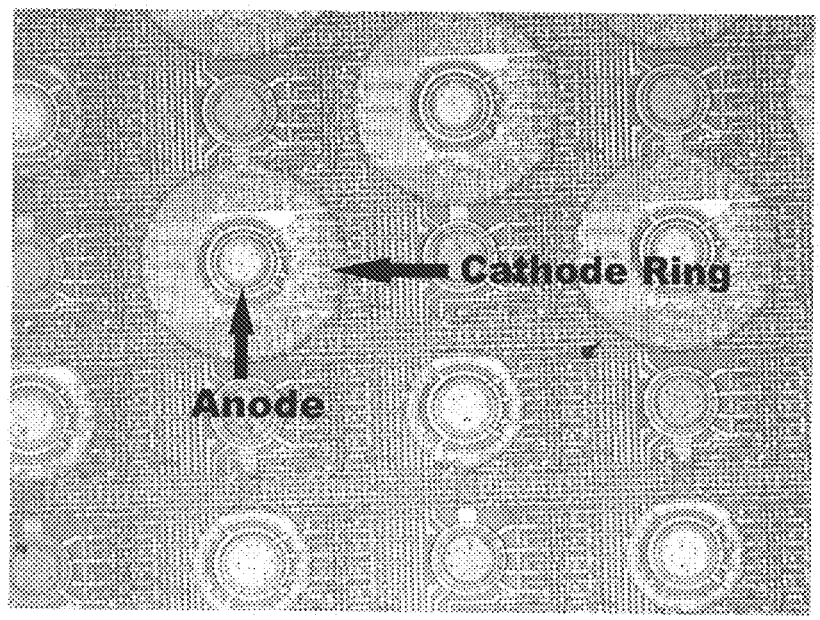
FIG. 6 shows a white light photograph of an electrode array containing the anode/cathode features diagrammed in FIG. 5.
Figure 7:
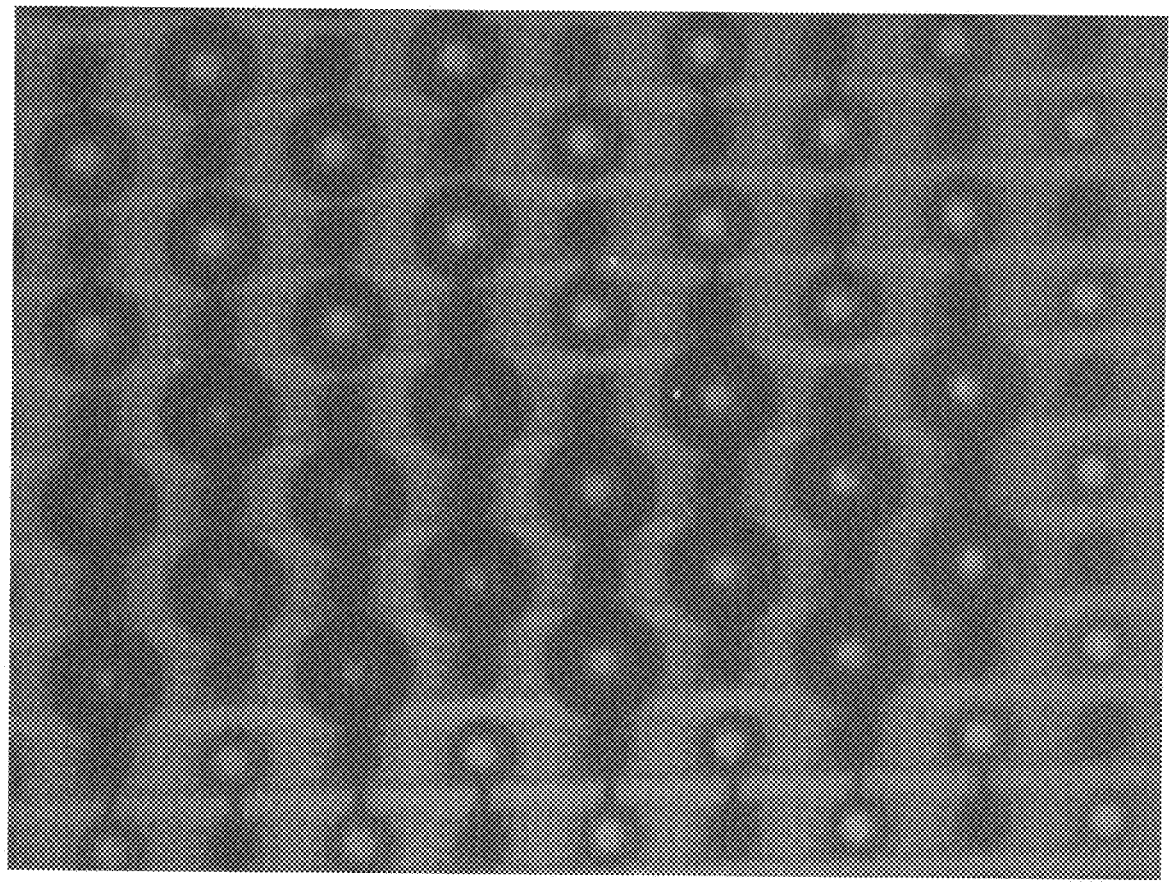
FIG. 7 shows synthesis results using an electrode-containing microarray device having continuous (circular) circumferential electrodes. A has oligonucleotide probe sequence (3' CCT CGA CCA CCG CAT 5') [SEQ ID NO. 1] was synthesized within a porous matrix located above an electrode functioning as an anode and having surrounding continuous circumferential electrodes acting as cathodes. The oligonucleotides were "deblocked" (by removing any remaining protecting groups after synthesis). The microarray was placed into a solution containing a complementary has sequence oligonucleotides having Texas Red® (TR) bound to the 3' end (5' GGA GCT GGT GGC GTA-TR 3') [SEQ ID NO. 2] and hybridized at 40.degree. C. for 30 minutes. The electrode-containing microarray was washed to remove excess unbound material the bright circular areas over interior electrodes (used as anodes during synthesis) show that the presence of the circumferential electrode properly contained electrochemically generated acids at the anode.

FIG. 6 shows a bright field image of a semiconductor electrode array device manufactured with circumferential electrodes (called "cathode ring" in the image). The functional active electrode is somewhat larger than the pad used for the counter electrode. The downside to this is that a active anode (functional electrode) is produced and the counter electrode pad can not be used for synthesis.

Figure 10:
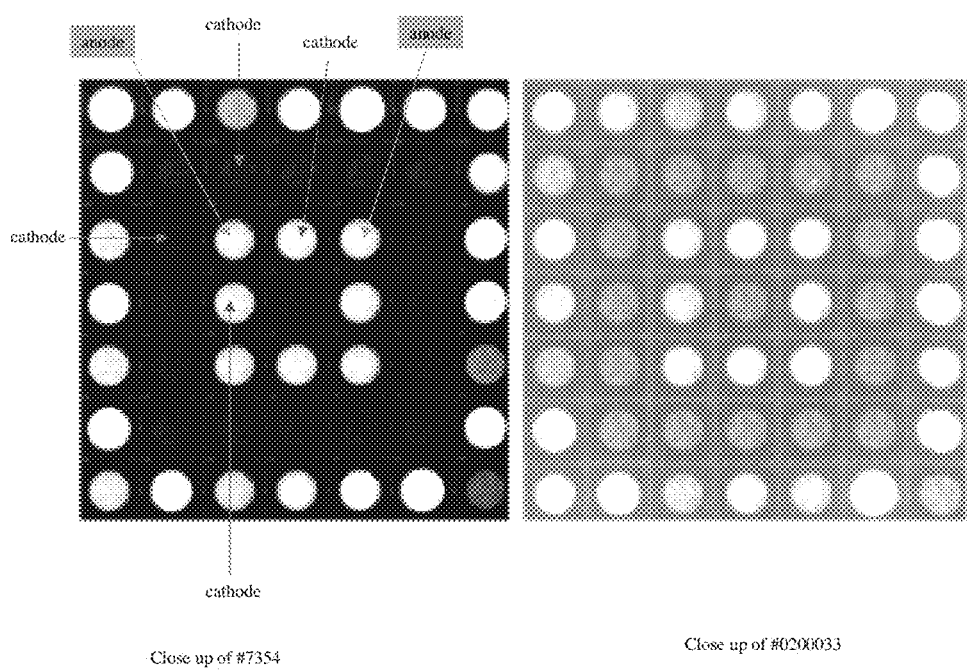
FIG. 10 shows an expanded portion of the electrodes show in FIG. 9. The electrode pattern on the left shows the portion of the electrode array device undergoing electrochemical synthesis of oligonucleotides using the inventive discontinuous circumferential method. The photo on the right shows the synthesis of oligonucleotides via the traditional electrochemical synthetic route (e.g., Montgomery U.S. Pat. No. 6,093,302) and relying on buffering methods. The picture on the left is much crisper and clearer, indicating in this direct, intrachip comparison (i.e., different regions of the same electrode array device done at the same time) that the inventive discontinuous electrode system does indeed perform electrochemical synthesis in a superior manner (that is, crisper regions of oligomer synthesis and lack of cross talk when sing very dense electrode arrays. The higher density electrode array in the right shows "bleed over" in the various steps.

Another format that is not depicted is to have a standard electrode array device made with circular electrodes arranged in rows and columns (see, for example, FIG. 10). In FIG. 10, there are lines separating each "cell" of the electrode array. A cell comprises an electrode and the associated circuitry needed to independently electronically access each electrode individually. In a preferred embodiment, the wires separating each cell can be raised to the surface of the electrode array (where the electrodes have surface exposure) and function as an array-wide grid of counter electrode for which ever electrodes are turned on in each electrochemical synthesis step. In prior embodiments of electrode arrays, one must view the electrode array device in three dimensions and not two dimensions (although the Figures are shows with a top-down view of two dimensions). The a grid wire counter electrode embodiment, the wires that provide for electronic communication between cells (that allow for independent electrodes to be separately addressed) are raised to the surface of the device (from a location within the device having at least one layer of passivation coating or insulating material separating the wire from the surface. Only when the wires are exposed to the surface of the electrode array device can the wires act as counter electrodes.

Similarly with regard to continuous circumferential electrodes, the continuous circumferential electrodes must be exposed to the surface of the device (and any solution bathing the device) in order to properly function as a counter electrode during electrochemical synthesis. Similar architectures (at least when looked at in two dimensions instead of three dimensions) have been made with getter electrodes added to an electrode array (see, for example, Montgomery patents). In a getter structure embodiment, by contrast, the circumferential getter electrode is located completely within the structure of the electrode array without surface exposure. The getter electrode can only function as a getter structure to scavenge ions within the device if it cannot act as a counter electrode during electrochemical synthesis. Therefore, although appearing similar from a two dimensional perspective, a getter electrode is substantially different both in location (located within instead of on the surface) and function from a continuous circumferential counter electrode of the present invention.

Figure 9:
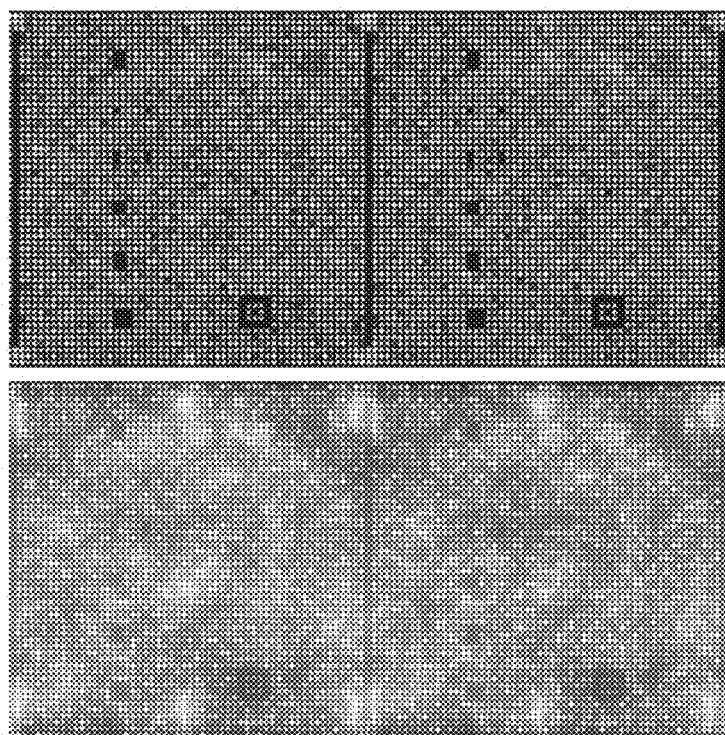
FIG. 9 shows hybridization data derived from the synthesis of various oligonucleotide probes on the microarray device shown in FIG. 8. The lower section shows the data from an electrode array device when the discontinuous electrodes system (shown in FIG. 8) was not used. The upper rows are when the discontinuous electrodes (shown in FIG. 8) are used. Both synthesis modalities still used various buffers solutions to prevent "cross talk" or diffusion from the region of one selected electrode site to a non-selected neighboring site.

In FIGS. 9 and 10, an electrode array having over 12,000 electrode cells was subject to electrochemical oligonucleotide synthesis using a discontinuous electrode method according to the present invention (top panels in FIG. 9 and left panel in FIG. 10). Synthesis of the same oligonucleotide probes were made with an anhydrous solution containing base (e.g., acetonitrile/methanol) solution (buffered deblocking solution) in the bottom panels of FIG. 9 and the right panel of FIG. 10. In the electrode array, the distance between the outer edges of neighboring electrodes is 33 microns. The oligonucleotides were synthesized with oligonucleotides of an average length of 35 bases complementary to regions of various human genes. A collection of random "9-mer" oligonucleotides (that is oligonucleotides with an average length of 9 bases) were labeled with a fluorescent probe and hybridized to the synthesized electrode array. The hybridization signal was measured with an appropriate fluorescent filter. The results (FIGS. 9 and 10) show confinement of the electrochemical reaction at the anode region to allow the oligo-synthesis to occur.

Discontinuous Circumferential Electrodes as Counter Electrodes

The following is a list of types of anode-cathode arrangements when having a grid of separately addressable electrodes and a solution bathing the electrode array. In a preferred embodiment, there is current flow set up between anodes and cathodes such that there is an acidic environment in the solution created around the anodes and a basic environment in the solution created around the cathodes. Because of this, there are different physical arrangements of anodes and cathodes that can help confine the acidic environment to particular anodes or sets of anodes.

In one embodiment, there is a common cathode or common counter-electrode.

Specifically, this arrangement has a large plate of conductive material overlaying the electrode array and already disclosed in WO 02/090963 A1. In a second embodiment, there is a continuous circumferential electrode. In the continuous circumferential electrode, a preferred form is a ring counter electrode wherein a circular active electrode is surrounded by a concentric ring counter electrode. However, other geometries, such as a square active electrode and concentric counter electrode, or a hexagon to hexagon or an octagon to octagon configuration are also within the scope of the present invention embodiment for continuous or discontinuous concentric counter electrodes having insulating material located between the outer edge of an active electrode and the inner edge of the counter electrode.

As a generalization, one might have any arrangement or pattern of anodes and cathodes where the electrodes in the array are used as anodes, cathodes, or are floating (and thus not used as either anodes or cathodes). In the examples provided for oligonucleotide synthesis, an acidic environment is generally needed for deblocking to occur and an acidic environment is made surrounding an anode. Thus, in the example, the anode is the active electrode and a cathode is the counter electrode. However, in other embodiments where a basic environment is needed at an active site for electrochemical synthesis, the currents would be reversed and a cathode would be considered the active electrode and an anode considered the counter electrode. Because these involve using electrodes either as anodes or cathodes, some electrochemical steps that could be one step for the "common cathode" approach might be multiple electrochemical steps.

One example is that every anode has its nearest-neighbor electrodes turned off (cathodes). In the following diagram (a grid of an electrode array having rows and columns of electrodes), an "a" denotes an anode, a "c" denotes a cathode, and a "." denotes an electrode that is floating (i.e., used as neither an anode nor a cathode).

ac........
c...c.....
...cac....
..........
....c.....
...cac....
....cac...
.....c....

With respect to multiple electrochemical steps, as an example, if one wanted to deprotect material over the following electrodes (denoted by "a" and which would be anodes in the "common cathode" approach).

aa........
..........
....aa....
..........
..........
..........
....aa....
....aa....
..........

This could be accomplished by two successive electrochemical steps, shown as follows with the first step on the left and the second step on the right.

ac........   cac.......
c...c......  .c...c....
...cac....   ....cac...
....c......  .....c....
..........   ..........
....c......  .....c....
...cac....   ....cac...
....cac...   ...cac....
.....c.....  ....c.....

Another example is having every anode surrounded by neighbor electrodes as cathodes, as in the following. By "neighboring" it is meant the horizontal, vertical and diagonal electrodes.

```
..........
...ccc....
...cac....
...ccc..cc
........ca
```

Another example is having each anode or group of anodes surrounded by a border of neighbor cathodes, as in the following arrangement.

```
aac.......
ccccccc...
...caac...
...cccc...
.....ccc..
...cccac..
...caaaccc
...caaaaac
...ccccaaa
```

Another example is having each anode or group of anodes surrounded by a border of nearest-neighbor cathodes, as in the following.

```
aac.......
cc..cc....
...caac...
....cc....
......c...
....ccac..
...caaacc.
...caaaaac
....cccaaa
```

Another example is having each anode with one closest-available electrode (i.e., a closest electrode that is not already being used as an anode or cathode) used as a cathode, as in the following.

```
aa........
cc........
....aa....
....cc....
......c...
....ccacc.
....aaaccc
....aaaaac
....cccaaa
```

Another example is having any electrode that-is-not an anode being set as a cathode, as in the following.

```
aaccccccc
ccccccccc
ccccaaccc
ccccccccc
ccccccccc
cccccaccc
ccccaaccc
ccccaaaac
cccccccaaa
```

In the foregoing diagrams, a software program can configure each step of an electrochemical oligomer synthesis reaction in any of the nearest neighbor, neighbor electrodes, border of neighbor electrodes, border of nearest-neighbor, one closest available electrode, electrode that is not approach, or a combination of various exemplified and unexemplified approaches.

Example 1

Figure 8:
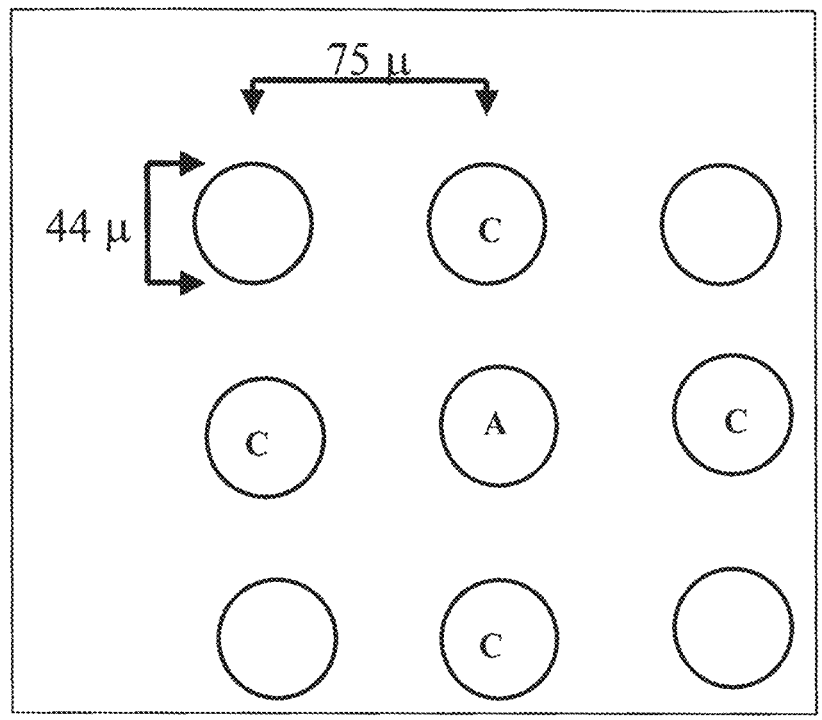
FIG. 8 shows a diagram and relative dimensions of the electrodes provided by a microarray or electrode array device having in excess of 12,000 electrodes in a region of semiconductor array of about 1 cm.sup.2. Circular electrode diameter was about 44 microns. The electrode distance-to-distance (or center point) was about 75 microns. The "C" in the circles represents that those electrodes set up to be cathodes and the "A" represent the single anode. It should be noted that an active anode can be surrounded by active cathodes in a cross configuration. This arrangement provides what is called "discontinuous circumferential electrodes." During each step of synthesis and deblocking, a particular electrode can function as an anode if it is active for a step or later as a cathode if it is to be used as a counter electrode in a discontinuous circumferential pattern.

This example provides a chemical description of an electrochemical buffer formulation using an electrode array having a plurality of discontinuous circumferential electrodes. The central electrode producing protons (i.e., anode) is surrounded by a discontinuous set of electrodes (i.e., acting as cathodes) that help neutralize the protons, which are produced and diffuse away from the anode (active electrode) as shown in FIG. 8. In FIG. 8, the active electrode marked "A" represents the anode. The surrounding electrodes marked "C" are the cathodes. The active electrode can be turned "on" (i.e., generate current flow or voltage) to generate acid, while the surrounding electrodes can also be "turned on" (opposite voltage or current flow) to produce base. The discontinuous circumferential ring of electrodes (cathodes or counter electrodes in this example) also represents a form of circumferential electrodes, but they are not attached to each other (i.e., are discontinuous). However, each of the "ring" of discontinuous circumferential electrodes is controlled one at a time or in concert. Thus, the resulting electrochemical synthesis step to form an oligomer synthesis is still run in a solution (preferably a buffered solution), but using this form of circumferential electrodes. This configuration is less costly than a continuous circumferential counter electrode system because it can employ a dense grid of separately controlled electrodes.

It is interesting that not all four surrounding electrodes surrounding an active electrode need to be turned on to confine the acid production. However, we have found this to be optimal in terms of the resulting quality of the electrochemical synthesis.

Example 2

This example illustrates different confinement techniques for electrochemical synthesis of oligonucleotides. We synthesized approximately 1,000 sequences of different 35-mer oligonucleotides on two separate CUSTOMARRAY™ oligonucleotide microarray devices each having over 12,000 electrode sites with a distance between the outer edges of circular electrodes of approximately 33 microns. For the control oligonucleotide microarray, we synthesized oligonucleotide probes electrochemically using the method disclosed in the Montgomery patents having a buffered deblocking solution to try to confine the acid generated at the active (anode) electrodes. This technique further utilized an off chip Pt electrode as a common counter electrode. In addition, four-fold extra systemic base was added to the deblocking solution for the control oligonucleotide array as compared with the inventive oligonucleotide array using a discontinuous circumferential electrode pattern. The pattern of oligonucleotide probe sequences synthesized was the same for both the control and inventive electrode arrays. Selected areas were utilized for comparisons.

For the discontinuous circumferential electrode synthesis procedure, we developed a "checkered pattern" where a central electrode is the anode and the surrounding electrodes play the role of the cathode. In order to always have 4 surrounding electrodes available for use as cathodes, a checker filter was applied to the electrode array before the anode locations were mapped. This ensured that even if two neighboring electrodes need to be activated during the same cycle of deblocking, it can only do so when neighboring electrodes in use are cathodes. This cyclical procedure for each electrode proceeded until complete deblocking was achieved for one electrode and it then switched functions. This way all the necessary or designated electrodes for a particular cycle had seen deblocking conditions.

The oligonucleotides were synthesized with oligonucleotides of an average length of 35 bases complementary to regions of various human genes. A collection of random "9-mer" oligonucleotides (that is oligonucleotides with an average length of 9 bases) were labeled with a fluorescent probe and hybridized to the synthesized electrode array. The hybridization signal was measured with an appropriate fluorescent filter. The results (FIGS. 9 and 10) show confinement of the electrochemical reaction at the anode region to allow the oligo-synthesis to occur. The results and comparisons between the two synthesis procedures are show in FIG. 9. The upper figure shows the fluorescence data for the synthesis of the oligonucleotide probes (average length of 35 nucleotides or "35 mers") using the inventive discontinuous circumferential electrodes. The lower panels show the control microarray device with the same oligonucleotide probes synthesized at the same locations by using the electrochemical synthesis approach disclosed in the Montgomery patents using buffered solutions to enclose a region of pH change and a Pt common counter electrode. The improvements in synthesis quality for electrode arrays with the 33 micron distance between outer edges of electrodes is a striking. In the inventive electrode array the confinement of synthesis is to each electrode area. The blurry mess for the buffered electrochemical synthesis approach described in the Montgomery patents method indicates that some bleeding ("crosstalk") has occurred.

FIG. 10 shows an expanded area of identical regions of a given the comparison oligonucleotide arrays. Here the difference in the results from the two methods is stark and better visualized. The use of discontinuous circumferential electrodes does provide much better containment of the acid produced. The dark areas of the array are regions where no synthesis has taken place. This region is not so clean on the synthesis performed on the control (right side). Protons have diffused to these neighboring electrodes and some synthesis has taken place.

Figure 11:
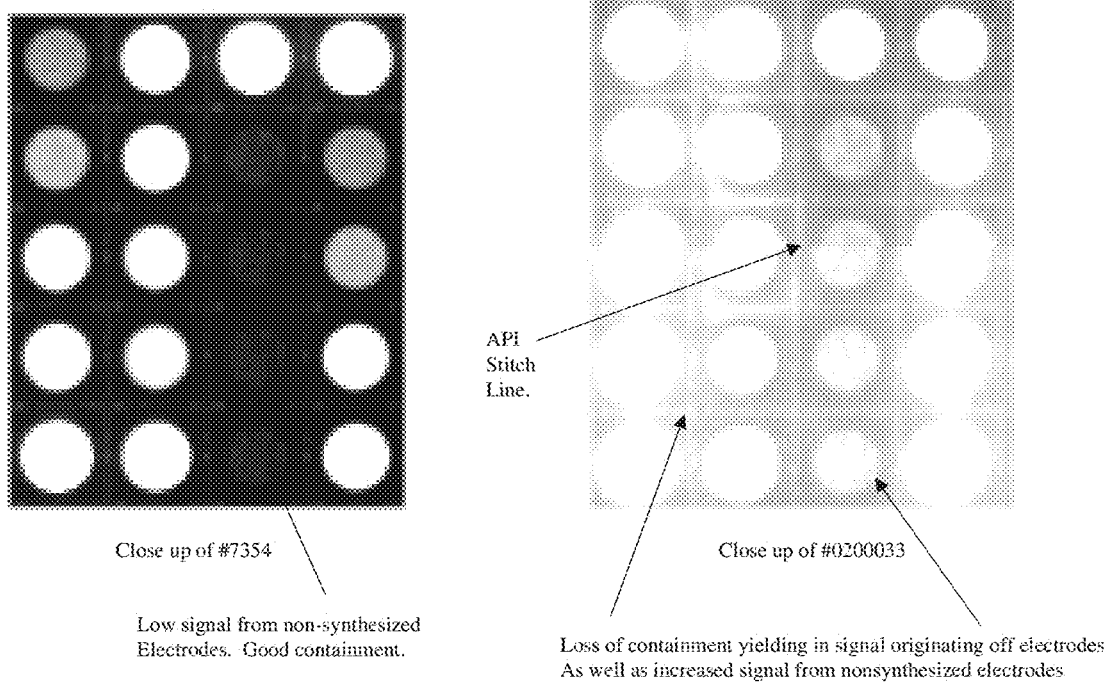
FIG. 11 shows another segment of the electrode array device shown in FIG. 9. The figure on the left is using the inventive discontinuous circumferential electrode synthesis method, while the figure on the right does not.
Figure 12:
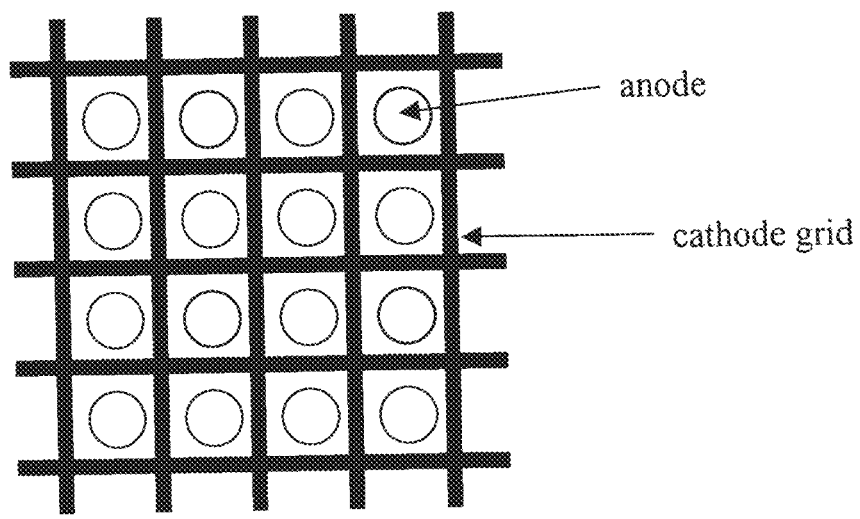
FIG. 12 shows another inventive embodiment wherein an array of electrodes in row and column format (marked "anodes" in the figure) has a surrounding line-based grid of counter electrodes marked "cathodes" in the figure. This embodiment is often referred to as the "tic-tac-toe" embodiment.

FIG. 11, shows the identical expanded areas for regions of the array shown in FIG. 9. Note that the quality of spots (and background) is much better when the discontinuous circumferential electrode method was used.

What is claimed is:

1. An oligonucleotide bound to a semiconductor electrode array comprising:
   an oligouncleotide bound to a porous reaction layer adsorbed to and forming a layer on a top surface of a semiconductor electrode array, where the semiconductor electrode array comprises a plurality of continuous circumferential electrodes, where each of the plurality of continuous circumferential electrodes is separately addressable, where each electrode of the plurality of continuous circumferential electrodes comprises:
   (a) a top conducting surface region, where the top conducting surface region is defined by a top conducting surface which makes up a part of the top surface;
   (b) an insulating material in a gap region, where the gap region is defined by an inner margin and an outer margin, where the inner margin borders with the insulating material that surrounds an anode of a first continuous circumferential electrode of the plurality of continuous circumferential electrodes and the outer margin is surrounded by a cathode of the first continuous circumferential electrode, where the anode is adapted to produce an acid, and where the cathode is adapted to produce a base; and
   (c) the porous reaction layer formed from polysaccharide material and monosaccharide material that adsorbs to the top conducting surface and contains free hydroxyl groups or free amine groups or sulfhydryl groups (or combinations thereof) for covalently binding the oligonucleotide, wherein the porous reaction layer forms a layer over the plurality of continuous circumferential electrodes.

2. The oligonucleotide of claim 1, where the polysaccharide material comprises disaccharide material.

3. The oligonucleotide of claim 1, where the insulating material that surrounds each of the plurality of continuous circumferential electrodes has an average distance between each of the plurality of continuous circumferential electrodes of no more than 10 microns from the outer margin to the inner margin.

4. The oligonucleotide of claim 1, where the plurality of continuous circumferential electrodes form a continuous grid pattern similar to a tic-tack-toe board.

5. The oligonucleotide of claim 1, where a voltage applied to the anode generates the acid.

6. The oligonucleotide of claim 1, where a voltage applied to the cathode generates the base.

7. The oligonucleotide of claim 1, where the base is generated to neutralize the acid.

8. The oligonucleotide of claim 7, where the acid migrating to the gap region is neutralized by means of the base.

9. The oligonucleotide of claim 7, where the acid is contained over the anode by means of the base.

10. The oligonucleotide of claim 7, where the base restricts the acid to a portion of the top surface.

11. An oligonucleotide bound to a semiconductor electrode array comprising:
an oligouncleotide bound to a porous reaction layer formed from polysaccharide material and monosaccharide material adsorbed to a semiconductor electrode array, where the semiconductor electrode array comprises a plurality of continuous circumferential electrodes, where each of the plurality of continuous circumferential electrodes is independently separately addressable, where the plurality of continuous circumferential electrodes comprise:
(a) an anode;
(b) a cathode; and
(c) an insulating material in a gap region, where the gap region is defined by an inner margin and an outer margin, where the inner margin borders with the anode, where the outer margin is surrounded by the cathode.

12. The oligonucleotide of claim 11, where the polysaccharide material comprises disaccharide material.

13. The oligonucleotide of claim 11, where the insulating material that surrounds each of the plurality of continuous circumferential electrodes has an average distance between each of the plurality of continuous circumferential electrodes of no more than 10 microns from the outer margin to the inner margin.

14. The oligonucleotide of claim 11, where a voltage applied to the anode generates an acid.

15. The oligonucleotide of claim 14, where a voltage applied to the cathode generates a base.

16. The oligonucleotide of claim 15, where the base is generated to neutralize the acid.

17. The oligonucleotide of claim 15, where the acid migrating to the gap region is neutralized by means of the base.

18. The oligonucleotide of claim 15, where the acid is contained over the anode by means of the base.

19. An oligonucleotide bound to a semiconductor electrode array comprising:
an oligouncleotide bound to a porous reaction layer adsorbed to and forming a layer on a top surface of a semiconductor electrode array, where the porous reaction layer comprises a monosaccharide and a polysaccharide, where the semiconductor electrode array comprises:
(a) a plurality of continuous circumferential electrodes; and
(b) an insulating material, where each of the plurality of continuous circumferential electrodes comprises:
(i) a top conducting surface, where the top conducting surface makes up a part of the top surface;
(ii) an anode and a cathode, where the anode and the cathode are independently separately addressable;
(iii) an insulating material;
(iv) an inner margin and an outer margin, where the inner margin borders with the insulating material that surrounds at least one continuous circumferential electrode and the outer margin is surrounded by the insulating material, where a voltage applied to the anode of one or more of the plurality of continuous circumferential electrodes generates an acid to initiate a synthesis, and where a voltage applied to the cathode of one or more of the plurality of continuous circumferential electrodes generates a base to contain the acid produces a base to neutralize and thereby contain the acid; and
(v) the porous reaction layer formed from polysaccharide material and monosaccharide material that adsorbs to the top surface and contains free hydroxyl groups or free amine groups or sulfhydryl groups (or combinations thereof) for covalently binding the oligonucleotide, wherein the porous reaction layer forms a layer over the semiconductor electrode array.

20. The oligonucleotide of claim 19, where the polysaccharide material comprises disaccharide material.

* * * * *